United States Patent [19]

Specht et al.

[11] 4,155,767

[45] May 22, 1979

[54] JET INK COMPOSITIONS CONTAINING TETRAHYDROFURAN SOLVENT

[75] Inventors: James Specht, Neenah; Lee Murray, Appleton, both of Wis.

[73] Assignee: American Can Company, Greenwich, Conn.

[21] Appl. No.: 910,902

[22] Filed: May 30, 1978

[51] Int. Cl.$^2$ .................... C09D 11/00; C09D 11/10
[52] U.S. Cl. .................. 106/22; 260/30.4 R; 260/30.4 N; 428/35; 428/209
[58] Field of Search ................ 260/30.4 R; 106/22-31

[56] References Cited

U.S. PATENT DOCUMENTS

| | | | |
|---|---|---|---|
| 3,519,443 | 7/1970 | Kaplan et al. | 106/22 |
| 3,551,187 | 12/1970 | Chong | 117/76 |
| 3,846,141 | 11/1974 | Ostergren et al. | 106/22 |

*Primary Examiner*—Carman J. Seccuro
*Attorney, Agent, or Firm*—Robert P. Auber; Ira S. Dorman; Ernestine C. Bartlett

[57] ABSTRACT

Ink compositions are provided which are suitable for use in ink jet printing on coated or uncoated substrates to form images which are highly resistant to abrasion and penetration by virtue of the penetrating characteristics of a select solvent system. The ink compositions may be of the binder or binderless type and contain, in the preferred embodiments, from about 0.1% to about 5% by weight of a colorant, optionally, from about 3 to 30% by weight of a soluble resole resin, a penetrating solvent consisting of tetrahydrofuran, an auxiliary solvent comprising a lower aliphatic alcohol, ketone, ether or aliphatic amide, a surfactant and an electrolyte.

12 Claims, No Drawings

JET INK COMPOSITIONS CONTAINING TETRAHYDROFURAN SOLVENT

BACKGROUND OF THE INVENTION

1. Prior Art

| | | |
|---|---|---|
| Banczak | 4,021,252 | May, 1977 |
| Wachtel | 4,024,096 | May, 1977 |
| Parkinson | 4,045,397 | Aug. 1977 |
| Hwang | 4,070,322 | Jan. 1978 |
| Keating | 2,356,065 | Aug. 1944 |
| Zabiak | 3,687,887 | Aug. 1972 |
| Zabiak | 3,705,043 | Dec. 1972 |
| Ostergren | 3,846,141 | Nov. 1974 |
| Miyajima | 3,912,520 | Oct. 1975 |
| Hertz | 3,994,736 | Nov. 1976 |
| Sambucetti | 4,026,713 | May, 1977 |

Edds et al., "Smear Resistant Jet Ink," IBM Technical Disclosure Bulletin, Vol. 16, No. 6, November 1973.

2. Field of Invention

Metal cans constitute a very widely utilized medium for the protective packaging of a great variety of products, many millions of cans being used daily for packaging of foods, beverages and many other materials. For many years, the common metal can was constructed of tinplated steel, and was customarily referred to in the industry as an ETP can, the initials standing for "electro-tin-plated." Containers of this type are referred to by the public at large as "tin cans." In recent years, however, the metal can industry has developed organic polymeric resinous coatings for metal cans which offer substantially the same protection to the steel as the traditional coating of metallic tin. These organic resin based coatings have been applied both as a top coat over the traditional thin tin coating and as the sole protective coating composition applied directly to the steel can body and/or end components to yield both resin coated ETP cans and resin coated untinned steel cans which are now referred to in the industry as "tin-free steel" or TFS cans.

Manufacturing and processing concerns which package various products in metal cans have found it highly desirable to print, at some point on the can surface, a series of coded symbols which carry information of interest primarily to the packager, including the particular machine on which the can was packed, the date and time of packing and perhaps even the identity of the machine operator. Such data are useful in case it is necessary to trace any particular can or cans after they have been packed.

Many of the products packaged in metal cans are subjected to conditions of high temperature and high moisture during pasteurization or sterilization procedures carried out before or after the can is filled with product and sealed. In order to be commercially satisfactory, the coded indicia printed on the cans must be capable of withstanding these processing conditions as well as being resistant to rubbing abrasion.

This invention is directed primarily to ink compositions suitable for printing identifying indicia on the resin coated surfaces of TFS, ETP and coated aluminum cans and can components as well as such metals free of organic resins by means of ink jet printing techniques. In a printing apparatus operating on the so-called "ink jet printing" principle, in general terms, a fluid ink is forced, under pressure, through a very small orifice in an orifice block which contains a piezoelectric crystal vibrating at high frequency (50–100,000 vibrations per second) causing the ink passing through the orifice to be broken into minute droplets equal in number to the crystal vibrations. The minute droplets are passed through a charging area where individual droplets receive an electrical charge in response to an electronic signal, the amplitude of the charge being dependent on the amplitude of the signal. The droplets then pass through an electrical field of fixed intensity, causing a varied deflection of the individual droplets dependent on the intensity of the charge associated therewith, after which the deflected drops are allowed to impinge on the base medium which is to receive the decorative or informative printed indicia. Apparatus suitable for carrying out the ink jet printing process is described in detail in U.S. Pat. Nos. 3,465,350 and 3,465,351, issued Sept. 2, 1969, and it is in connection with an apparatus and process as described in the aforementioned patents that the ink of the present invention is designed to function.

In order to operate satisfactorily in an ink jet printing system, an ink must display a consistent breakup length, drop velocity and drop charge under set machine operating conditions. To achieve these ends, the ink must meet strict requirements with regard to viscosity and resistivity, solubility and compatibility of components, stability and anti-skinning properties and must readily re-dissolve in a suitable solvent for rapid cleanup of the machine components with a minimum of effort. In order to facilitate cleanup of the apparatus after use, the ink components should be readily soluble in a common solvent medium. This will prevent any gradual buildup of ink residues in the system which could result in malfunction.

The ink properties set forth above are primarily established by the requirements of the jet printing apparatus. In addition to these requirements, the ink must possess certain other properties which are specifically related to its intended use in the printing of metal cans and, in particular, can bodies intended for the packaging of foodstuffs and beverages.

For example, the ink must properly wet the can surface, whether coated or uncoated, on which the printed indicia are to appear. If the ink is of such composition that it fails to readily wet the coated metal surface, the ink will bead up on the surface and fail to adhere properly to it. In extreme cases, the beaded drops will coalesce into larger droplets which run and make the printing completely unintelligible. The problem is particularly accentuated by oily or greasy residues left on the can surface from earlier stages of fabrication of the container. On the other hand, if the ink is of such composition as to wet the coated metal surface too readily, the ink drops will flatten out and spread excessively on the surface, diluting the color intensity of the ink and overlapping the image of adjacent dots making the printed image fuzzy and the characters unintelligible. In addition to the requirement of proper wetting of the surface to be printed, the droplets of ink must adhere strongly to the surface after application and drying so that the printed matter is resistant to both physical rubbing or abrasive action and also is resistant to moisture. The ability of the ink to form and retain a desired image on a TFS or coated ETP or aluminum can surface in the presence of moisture and the ability to resist removal by moisture is of great importance in this application because the metal can surfaces are generally damp before, during and after the printing operation. It is particularly difficult to maintain satisfactory adhesion of the ink to metal cans which are subjected to pasteurization, the combination of moisture and high temperature utlized in this process tending to cause the coloring matter to bleed, and to severely reduce the adhesion of the ink to the can body so that it is readily removed by subsequent rubbing or abrasion.

Several attempts have heretofore been made to provide jet ink compositions meeting all of the above requirements and overcoming the difficulties enumerated. One example is U.S. Pat. No. 4,021,252 issued May 3, 1977 to Daniel Philip Banczak and William Eric Tan and commonly assigned herewith, said patent providing excellent inks of the binder type exhibiting the above discussed properties and which are particularly suitable for use on coated and uncoated aluminum cans. Representative inks therein comprise a colorant, a shellac binder, a glycol solvent binder and a water-alcohol blend.

Other examples are inks described and claimed in application Ser. No. 634,507 filed Nov. 24, 1975 of R. L. Germonprez, also commonly assigned herewith. The inks of said application are of the binderless type comprising a colorant and a homogeneous blend of water, a lower aliphatic alcohol, an oxygenated aliphatic or cyclic ketone, a surfactant and an aliphatic hydrocarbon. The ink compositions are designed primarily for use on coated TFS or ETP metal cans and comprise a solvent system so selected as to soften and swell the organic polymer substrate sufficiently to allow penetration of the sub-surfaces thereof whereby the indicia printed on the substrate become highly resistant to abrasion and sterilization process. In said compositions, the function of the aliphatic hydrocarbon is to penetrate the thin layer of oily material which serves as a lubricant on the resin coated metal surfaces of can components in the can forming operations.

The present invention represents an improvement over the inks referred to above. It has been found that the presence of tetrahydrofuran in such compositions conveys unexpectedly improved characteristics in the ability of the ink composition to penetrate varied types of organic coatings and lubricants and at the same time improves the ability of both binder and binderless types of ink compositions to properly wet a larger number of substrates including coated and uncoated aluminum or steel. Additionally, such improvements are readily observed whether water is present or absent as a component of the composition. Solvent volatility is likewise improved.

SUMMARY OF THE INVENTION

The objectives of this invention are achieved by ink compositions which are of the binder or binderless type. Representative compositions may be illustrated by Type A binderless jet inks devoid of water and comprising from about 0.1 to 5% of a colorant; a solvent system comprising 40 to 85% tetrahydrofuran, (hereafter referred to as THF); 10 to 30% of a lower aliphatic alcohol or mixture thereof; 0 to 50% of an auxiliary solvent; 0 to 5% of an electrolyte and 0 to 2% of a surfactant;

Type B binderless jet inks comprising from about 15 to 20% THF and 80-85% of a composition comprising about 10 to 35% water, 6 to 25% aliphatic alcohol or mixtures thereof, 20 to 65% of an oxygenated aliphatic or cyclic ketone, aldehyde, acetal, ether or ester solvent; 1 to 17% electrolyte, 6 to 17% surfactant and 0.5 to 5% of a colorant; and Type C binder jet inks comprising 25 to 80% THF, 1 to 20% of a binder resin, 0.1 to 5% of a colorant, 0 to 5% of a surfactant and 0 to 74% of an auxiliary solvent.

DETAILED DESCRIPTION OF THE PREFERRED EMBODIMENTS

As described hereinabove, the ink compositions of this invention may be of three types all of which comprise THF as an essential component thereof which, in combination with other components, conveys improvements in volatility, wetting ability, speed of process, and particularly in the ability to penetrate a variety of lubricants and organic resin coatings.

Also as described hereinabove, the inks of the invention are applicable to coated and uncoated steel or aluminum. The binderless inks are applicable to metal coated with a variety of coatings including epoxy resins, epoxy-urea formaldehydes resins, polyester-epoxy resins, acrylic resins, polyvinyl chloride resins, etc. and have the ability to penetrate oily lubricants present on the surfaces of said coated metal including both internal and external lubricants, lubricants such as petroleum wax, silicone, polyolefin, lanolin, wax, mineral oil, etc. Inks of this type containing THF temporarily soften and swell the polymeric resin coating of the metal substrate, sufficiently to allow the colorant component of the ink to penetrate the surface layers of the polymeric coating. Upon removal of the ink solvents by evaporation, the colorant component of the ink remains embedded in the resinous polymeric can coating, primarily within the coating rather than on the surface thereof. The protective coating of the TFS or coated ETP or aluminum can thereby serves not only as the substrate for supporting the printed indicia, but also as the binder for the ink which, because of the penetration of the colorant into the internal structure of the coating, becomes an integral part of the coating and is substantially immune to abrasion.

The binder type inks, though applicable to either coated or uncoated steel or aluminum, are most practically beneficial to such cans devoid of organic coatings. In this instance, THF conveys the same advantages of volatility, speed of process, wettability of the substrate and penetration of oily lubricants as discussed relative to the binderless coatings but in this instance, the compositions themselves comprise a binder which adheres to the metal substrate and in which the colorant is embedded and rendered abrasion resistant.

As indicated, to be effective in the process of the present invention, the ink solvents of both types, i.e., binder or binderless, must be capable of penetrating any waxy or oily lubricating film residues which remain on the surface of the coated TFS can as a result of the processing steps utilized in stamping and shaping the can components from sheet or roll stock, and where the components are coated, must effect temporary softening and swelling of the polymeric resin can coating sufficient to allow penetration of the colorant into the swollen body of the coating.

In the selection of the ink solvents, therefore, consideration must be given to achieving the desired effects on the can components and/or coatings a well as obtaining the proper solubility for the colorant and other components of the ink and also to achieving the desired viscosity and evaporative characteristics, as will be discussed hereinafter. Consideration must also be given to the propensity of the solvent to wet the substrate as measured by the property of surface tension of the solvent and of the ink composition incorporating it. Water, for example, will not properly wet the surface of a TFS can because of its undesirably high surface tension (72 dyne cm. at standard temperature) and inks having a water base are not satisfactory for use in metal can printing, although such inks have been employed in jet prnting of paperboard, for example, since paperboard surfaces are readily wet by water. On the other hand, oxygenated solvents such as ketones, alcohols, ethers and esters, which have surface tensions much lower than water, wet TFS cans so readily that the coated metal surface is flooded by the solvent, which spreads out and merges with other droplets to obscure the limits of any indicia printed by use of these solvents. The inks of the present invention, as used on a TFS can surface, are compounded to have surface tensions at 68° F., of between about 20 and 23 dyne cm., the lower portion of this range being generally preferred. For ETP surfaces, these values will be in the range of 22 to 25 dyne cm. and for aluminum in the range of 22 to 25 dyne cm.

BINDERLESS TYPE A INK COMPOSITION

Typical ink compositions are desirably devoid of water since its presence tends to decrease the activity of the THF solvent. The compositions are primarily designed as quick-drying penetrating jet inks for use on coated TFS cancomponents and comprise 0.1 to 5% colorant; 40 to 85% THF; 10 to 30% of a lower aliphatic alcohol or mixture thereof; 0 to 50% of an auxiliary solvent; 0 to 5% of an electrolyte and 0 to 5% of a surfactant.

Suitable colorants are preferably of the basic triphenyl-methane type dyes including Crystal Violet (C.I. 4255), Victoria Blue (C.I. 44045), Solvent Red 49 (C.I. 45170:), etc. The colorant dye may also function as the electrolyte of the composition or may partially so function when the composition comprises a separately added electrolyte.

The lower aliphatic alcohol may be one containing 1 to 3 carbon atoms such as methanol, ethanol, propanol and mixtures thereof. The alcohol comonent lends homogeneity to the composition and enhances conductivity. Methyl alcohol is preferred.

The auxiliary solvent may be an aliphatic or cyclic ketone, amide, ester or ether and functions in the composition to limit ink volatility while maintaining some level of penetrability of lubricants and coatings. Examples of such solvents include 2-butanone, 2-pentanone, hexanone, 2-heptanone, 2-octanone, propyl ether, butyl ether, furan, dioxane, ethyl acetate, propyl acetate, butyl acetate, dimethyl acetamide, dimethyl formamide, etc.

Suitable electrolytes and/or surfactants which may be incorporated include dimethyl amine hydrochloride, diethylamine hydrochloride, morpholine hydrochloride, etc.

A representative formulation exemplifying the Type A binderless ink is illustrated by:

| THF | 80% |
| --- | --- |
| Methanol | 12% |
| Dimethyl Acetamide | 5% |
| Dimethylamine: HCl | 1% |
| BASF Crystal Violet FN | 2% |

BINDERLESS TYPE B INK COMPOSITIONS

These ink compositions are a hybrid of the penetrating inks disclosed in the above-referred to application Ser. No. 634,507 and in general will comprise admixture of from 15 to 20% THF with such compositions. Typical compositions will comprise, in addition to the THF, from about 10 to 35% water, 6 to 25% lower aliphatic alcohol or mixtures thereof, 25 to 75% of an aliphatic or cyclic ketone, aldehyde, acetal, ether or ester solvent, 1 to 17% electrolyte, 6 to 17% surfactant and 0.5 to 5% of a colorant, such auxiliary solvent, electrolyte, and surfactant being compounds listed hereinabove with the Type A compositions. The electrolyte may be chosen from a group listed in Ink Type A compositions, however, an anionic surfactant such as sodium lauryl sulfate can function both as an electrolyte and as a surfactant. Nonionic surfactants which achieve a homogeneous composition of the other ink components may also be used. In this case, however, a separate electrolyte will be provided.

The hybrid compositions are likewise designed primarily for use with coated aluminum or TFS cans. A representative formulation exemplifying the Type B binderless ink is illustrated by:

| THF | 15.5% |
| --- | --- |
| 2-Heptanone | 48.2% |
| Water | 11.8% |
| Methanol | 10.1% |
| 1-Decene | 2.5% |
| Sodium lauryl sulfate | 11% |
| Victoria Blue | 0.8% |

BINDER TYPE C INK COMPOSITIONS

The binder inks of this invention are suitable for use on both coated and uncoated TFS, ETP and aluminum substrates, the greatest advantage being observed on uncoated cans, the binder having the requisite properties of solubility in the solvent medium and ability to anchor the color component on the uncoated metal surface. At the same time, the solvent component properly wets the metal surface, penetrates waxy or oily lubricant present on the surface which may impede adhesion of the ink and coveys additionally improved volatility and increased speed of process. Of course, the binder type ink compositions may also be utilized with coated metal cans where the solvent will penetrate the coating carrying the colorant and binder into the subsurfaces of the coating. In this respect, the compositions function in the same way as the binderless type compositions described hereinabove. Since many canners frequently change from coated to uncoated containers, provision of these types of compositions provide the ability to produce printed indicia by either of two mechanisms, i.e., by penetration or adhesion.

Many resins having the requisite molecular weight, solubility and compatibility with the other ink components and adherence to the substrate may be employed herein.

Particularly preferred for use herein are heat-sensitive phenolic resins of the resole type. Such resins include those derived from phenol-formaldehyde, resorcinol-formaldehyde, etc. Suitable resole resins for use herein are solution compatible, alcohol and ketone soluble cross-linked polymers or prepolymers having molecular weights within the range of about 1,300 to about 10,000. Such resins are alkaline catalyzed phenol-formaldehyde condensation products in which the ratio of formaldehyde to phenol is greater than one and are usually identified as "B-stage" resins which are curable at elevated temperature by further condensation and/or cross-linking through hydroxymethyl groups to insoluble, chemically resistant, adherent polymers. Such resins are well known in the art. Preferred resins for use herein are commercially available under the trade names BLS-2700 and BKS 2620 from Union Carbide Corp. Mixtures of these resins may also be employed. Such alcohol-soluble binders may be employed as such or they may be modified by admixture with other resins including polyvinyl butyral, polyvinyl acetate, polyacrylics, ethylene-acrylic copolymers, polyamides, etc. Typical formulations will comprise from about 25% to 90% by weight THF, 1 to 20% by weight resin binder, 0.1 to 5% dye, 0 to 5% surfactant, and 0 to about 74% auxiliary solvents. The auxiliary solvents, including lower aliphatic alcohols, ketones, ethers, esters, amides, etc. and mixtures thereof as well as the colorant dye, surfactant, and electrolyte are selected from the same compounds described hereinabove with respect to the binderless type inks.

A representative formulation exemplifying the binder inks is illustrated by:

| | |
|---|---|
| THF | 31.5% |
| 2-Butanone | 31.5% |
| Methanol | 13.0% |
| Dimethyl formamide | 10.0% |
| BLS 2700 phenol-formaldehyde resin | 10.8% |
| Crystal Violet FN | 1.5% |
| Dimethylamine hydrochloride | 1.7% |

The following examples will serve to further illustrate the invention.

EXAMPLE 1

The following ink compositions were formulated as follows:

| Formulation A. | |
|---|---|
| THF | 80% |
| Methanol | 12% |
| Dimethyl Acetamide | 5% |
| Dimethylamine hydrochloride | 1% |
| Crystal Violet FN | 2% |

| Formulation B | |
|---|---|
| 2-Heptanone | 48.2% |
| THF | 15.4% |
| Methanol | 10.1% |
| Water | 11.8% |
| Sodium lauryl sulfate | 11.0% |
| 1-Decene | 2.5% |
| Victoria Pure Blue FGA dye | 1.0% |

| Formulation C | |
|---|---|
| THF | 74.5% |
| Methanol | 11.2% |
| Dimethyl formamide | 4.2% |
| BLS-2700 phenol-formaldehyde resin | 7.4% |
| Crystal Violet | 1.8% |

| -continued | |
|---|---|
| Formulation C | |
| Dimethylamine hydrochloride | 0.9% |

The above formulations A and B were employed in a jet printing apparatus to print indicia on the ends of coated aluminum and ETP cans containing beer. Formulation C was also employed in a jet printing apparatus to print indicia on the ends of uncoated TFS cans containing beer. The printed indicia dried very quickly to form images having excellent resistance to abrasion and excellent resistance to water. During more than 150 hours of operation of the jet printing units with the ink compositions set forth above, evaporative losses from the ink supply system were compensated for by the addition, as needed, of make-up solution containing a suitable amount of volatile solvents.

EXAMPLE 2

To further illustrate the advantages of the ink compositions of this invention, additional ink compositions devoid of THF and outside the scope of the present invention were prepared for comparative purposes:

| Formulation D | |
|---|---|
| Sodium lauryl sulfate | 13.0% |
| 2-Heptanone | 57.0% |
| Water | 14.0% |
| Methanol | 12.0% |
| 1-Decene | 3.0% |
| Victoria Pure Blue FGA | 1.0% |

| Formulation E | |
|---|---|
| Shellac | 4.4% |
| Solox (denatured ethanol) | 10.2% |
| Methanol | 52.7% |
| Dimethylamine hydrochloride | 1.4% |
| Ammonium hydroxide (26° Baume) | 0.8% |
| Victoria Pure Blue FGA | 0.9% |
| Water | 20.0% |
| Methyl cellosolve | 9.6% |

| Formulation F | |
|---|---|
| Proprietary ink "M&T 470" - (M&T Chemicals). | |

The formulations of Example 1 and formulations D, E and F above were employed in a jet ink printing apparatus to apply identifying indicia on various types of TFS varnishes having various types of internal and external lubricants either incorporated therein or applied thereto.

The substrates were in the form of TFS lids for metal containers and were selected and tested without regard to bake conditions imposed on the varnish to best simulate conditions in a canning plant to test the effect of the inks on such varnishes and ends randomly selected. Additionally ends having varnishes applied thereto obtained from canners in which the varnish resin type and lubricants employed were unknown were included in the random selection and testing. These ends are designated under the alphabetical designation A-F, M, and V-Z.

The adhesion and penetrability of indicia applied was evaluated by applying the indicia, rubbing with thumb pressure after a 15 second interval. The indicia which had not dried sufficiently resulted in smudging by thumb scuffing and were deemed to have inadequate penetrability and rub-resistance. Such results are indicated in the Table which follows by the designation F for failed; in those instances where legibility was reduced by indicia were readable, the results are indicated by M for marginal; and in those instances where indicia retained boldness of legibility, the results are indicated by P for pass.

Wettability and visibility of the indicia is evaluated by measuring the dot diameters, in millimeters. Such diameter measurement indicates how well the ink spreads on the metal substrate, the higher the value, the more visible the indicia.

The "% in solids" in the Table represents the % of lubricant added prior to applying the varnish to allow the metal plate to be handled during forming of the can components and is expressed as the percentage of lubricant comprising the total solids of the varnish.

paring the hybrid ink of the invention, i.e., addition of THF to formulation D and the improvements thereover. Example 6 is particularly informative in illustrating the ability of the THF component in Formulation B to convey improved penetrability through high levels of silicone lubricant while the same formulation without the THF, Formulation D, does not so penetrate and fails.

Comparison of the binder ink of the invention, Formulation C, with other binder inks (Formulations E and F) shows improved wettability, penetration and image formation since although the number of ends passing the rub test are approximately the same, the average dot diameter is larger and the image is therefore more visible.

In every respect, the binderless compositions of the invention are superior to the comparative binderless ink and represent an improvement thereover.

We claim:

1. An ink composition suitable for use in jet ink print-

TABLE

| | | | | Ink Formulation Adhesion, Pass (P) Marginal (M) Failure (F), | | | | Dot Diameter, mm | |
|---|---|---|---|---|---|---|---|---|---|
| Example No. | Varnish-Resin Type | Lubricant Type | % in Solids | Binderless A | Binderless B | Binder C | Binderless D | Binder E | Binder F |
| 1. | epoxy-urea formaldehyde | Wax | 0.66 | P,0.48 | F,0.42 | P,0.48 | F,0.26 | F,0.18 | P,0.30 |
| 2. | epoxy-urea formaldehyde | None | 0. | P,0.60 | P,0.41 | P,0.52 | P,0.42 | P,0.35 | P,0.42 |
| 3. | epoxy-urea formaldehyde | Lanolin | 1.5 | P,0.55 | P,0.55 | P,0.53 | P,0.41 | F,0.37 | P,0.47 |
| 4. | polyester-amine | Wax Silicone Mineral Oil | 2.0 0.33 0.17 | P,0.48 | P,O.41 | P,0.52 | P,0.35 | P,0.41 | P,0.45 |
| 5. | modified epoxy | Wax | 0.18 | P,0.51 | P,0.40 | P,0.52 | P,0.38 | P,0.31 | P,0.40 |
| 6. | polyester amine | Silicone | 0.30 | P,0.23 | P,0.35 | P,0.50 | F,0.33 | P,0.31 | P,0.42 |
| 7. | epoxy-urea formaldehyde | Lanolin | 1.5 | P,0.36 | P,0.44 | P,0.25 | P,0.41 | M,0.40 | M,0.35 |
| 8. | epoxy-urea formaldehyde | Polyolefin | 0.75 | P,0.34 | F,0.45 | P,0.50 | F,0.37 | M,0.35 | P,0.50 |
| 9. | modified acrylic | Petrolatum Silicone | 2.0 — | F,0.13 | M,0.42 | P,0.52 | M,0.46 | F,0.40 | P,0.45 |
| 10. | modified acrylic | None | — | P,0.60 | P,0.45 | P,0.50 | P,0.47 | P,0.40 | P,0.40 |
| 11. | epoxy-urea formaldehyde | Lanolin | 1.5 | P,0.30 | P,0.37 | P,0.30 | P,0.38 | M,0.28 | P,0.30 |
| 12. | "A" | — | — | P,0.48 | M,0.45 | F,0.38 | M,0.37 | F,0.37 | P,0.40 |
| 13. | "B" | — | — | P,0.57 | M,0.40 | P,0.48 | F,0.45 | F,0.35 | P,0.37 |
| 14. | "C" | — | — | P,0.64 | P,0.55 | P,0.50 | P,0.40 | F,0.37 | M,0.49 |
| 15. | "D" | — | — | P,0.49 | M,0.42 | M,0.45 | F,0.41 | F,0.35 | P,0.40 |
| 16. | "E" | — | — | P,0.49 | P,0.46 | P,0.55 | P,0.45 | F,0.40 | P,0.49 |
| 17. | "F" | — | — | P,0.45 | P,0.40 | M,0.42 | P,0.37 | F,0.35 | P,0.40 |
| 18. | "V" | — | — | P,0.55 | P,0.49 | P,0.42 | P,0.45 | F,0.37 | P,0.30 |
| 19. | "W" | — | — | P,0.60 | F,0.60 | P,0.40 | F,0.49 | M,0.32 | P,0.42 |
| 20. | "X" | — | — | P,0.40 | F,0.36 | M,0.24 | F,0.40 | F,0.35 | M,0.32 |
| 21. | "Y" | — | — | P,0.45 | M,0.30 | M,0.30 | M,0.40 | F,0.42 | P,0.38 |
| 22. | "Z" | — | — | P,0.50 | P,0.50 | M,0.27 | M,0.55 | F,0.27 | M,0.40 |
| 23. | "M" | — | — | P,0.30 | F,0.37 | P,0.25 | F,0.34 | M,0.30 | M,0.34 |
| | | Total Passed | | 22 | 13 | 17 | 11 | 5 | 18 |
| | | Total Marginal | | 0 | 5 | 5 | 4 | 5 | 5 |
| | | Total Failed | | 1 | 5 | 1 | 8 | 13 | 0 |
| | | Average Dot Diameter | | 0.46 | 0.43 | 0.44 | 0.41 | 0.35 | 0.40 |

It will be seen from the data set forth in the Table that ink compositions of the invention possess the ability to penetrate and adhere to a broad spectrum of varnishes having a variety of lubricants on the surfaces thereof.

Wettability and image formation for each of the compositions A, B and C of the invention were superior to all of the compared inks as illustrated by the larger dot diameters.

Formulation A, having a higher percentage of the THF, was the best overall ink tested. The overall results obtained with formulations B and D are useful in coming operations consisting essentially of a composition selected from the group consisting of:
(1) binderless jet inks substantially devoid of water and comprising from about 0.1 to 5% of a colorant; a solvent system comprising 40 to 85% tetrahydrofuran; 0 to 50% of an auxiliary solvent; 0 to 5% of an electrolyte and 0 to 5% of a surfactant;
(2) binderless jet inks comprising from about 15% to 20% by weight of tetrahydrofuran and 80 to 85% by weight of a composition comprising 10 to 35% water, 6 to 25% lower aliphatic alcohol, 25 to 75% of an auxiliary solvent; 1 to 17% electrolyte; 6 to 17% surfactant and 0.5 to 5% of a colorant; and (3) binder jet inks comprising from about 25% to 90% tetrahydrofuran, 1 to 20% of a soluble resole binder resin, 0.1 to 5% of a colorant, 0 to 5% of an electrolyte, 0 to 5% of a surfactant and 0 to 74% of an auxiliary solvent.

2. A jet ink composition as claimed in claim 1 wherein said auxiliary solvent in inks (1) and (2) are selected from the group consisting of 2-butanone, 2-pentanone, hexanone, 2-heptanone, 2-octanone, propyl ether, butyl ether, furan, dioxane, ethyl acetate, propyl acetate, butyl acetate, dimethyl acetamide, dimethyl formamide, and mixtures thereof.

3. A jet ink composition as claimed in claim 1 wherein said aliphatic alcohol is methanol, ethanol, isopropanol or mixtures thereof.

4. A jet ink composition as claimed in either of claims 1, 2, or 3 wherein said electrolyte is dimethyl amine hydrochloride.

5. A jet ink composition as claim 4 wherein said surfactant is sodium lauryl sulfate.

6. A jet ink composition, capable of bonding to steel and aluminum substrates having polymeric resin coatings or a combination of polymeric resin coatings and lubricants on the surfaces thereof, said composition penetrating the lubricant and polymeric resins to effect adhesion to said metal substrate and comprising from about 40 to 85% tetrahydrofuran, 10 to 30% methanol or ethanol, 0 to 50% dimethyl acetamide, and 0 to 5% dimethylamine hydrochloride, and 0.1 to 5% of a colorant.

7. A jet ink composition capable of bonding to steel or aluminum substrates having polymeric resin coatings or a combination of polymeric resin coatings and lubricants on the surfaces thereof, said composition penetrating the lubricant and polymeric resins to effect adhesion to said metal substrate and comprising from about 15% to 20% by weight of tetrahydrofuran and 80 to 85% by weight of a composition comprising 12 to 35% water, 8 to 25% methanol or ethanol, 25 to 75% 2-heptanone, 8 to 17% sodium lauryl sulfate, and 0.5 to 5% colorant.

8. A jet ink composition, capable of bonding to uncoated steel and aluminum substrates or such substrates having polymeric resin coatings or lubricants or combinations thereof on its surfaces, said compositions penetrating the lubricants or resins to effect adhesion to said substrate and comprising from about 25 to 80% tetrahydrofuran, 1 to 20% by weight of a soluble phenol formaldehyde or resorcinol formaldehyde resole resin, 0.1 to 5% of a triphenylmethane basic dye, 0 to 5% dimethylamine hydrochloride, 0 to 5% surfactant, 0 to 74% dimethyl formamide and 0.1 to 5% of a colorant.

9. A jet ink composition as claimed in claim 8 wherein said resole resin has a molecular weight of about 1300 to 10,000 and is derived from the alkaline catalyzed condensation of phenol or resorcinol with formaldehyde, in which the ratio of formaldehyde is greater than one.

10. A jet ink composition capable of bonding to steel and aluminum having polymeric resin coatings or a combination of polymeric resin coatings and lubricants on the surfaces thereof comprising 80% tetrahydrofuran, 12% methanol, 5% dimethyl acetamide, 1% dimethyl amine hydrochloride and 2% Crystal Violet FN.

11. A jet ink composition capable of bonding to steel and aluminum having polymeric resin coatings or a combination of polymeric resin coatings and lubricants on the surfaces thereof comprising 15% tetrahydrofuran, about 12% water, 10% methanol, 48% 2-heptanone, 11% sodium lauryl sulfate, 2.5% 1-decene, and 1% Victoria Blue colorant.

12. A jet ink composition capable of bonding to coated and uncoated aluminum steel having lubricants on the surfaces thereof comprising 32% tetrahydrofuran, 13% methanol, 32% 2-butanone, 10% dimethyl formamide, 11% phenol-formaldehyde resole resin, 2% Oil Soluble Red Colorant and 2% dimethylamine hydrochloride.

* * * * *